United States Patent
Bos et al.

(10) Patent No.: US 8,980,194 B2
(45) Date of Patent: Mar. 17, 2015

(54) STACKED CATALYST BED FOR FISCHER-TROPSCH

(75) Inventors: Alouisius Nicolaas Renée Bos, Amsterdam (NL); Peter John Van Den Brink, Amsterdam (NL); Thomas Joris Remans, Amsterdam (NL); Erwin Roderick Stobbe, Amsterdam (NL); Dominik Johannes Michael Unruh, Amsterdam (NL); Ronald Vladimir Wisman, Amsterdam (NL)

(73) Assignee: Shell Oil Company, Houston, TX (US)

( * ) Notice: Subject to any disclaimer, the term of this patent is extended or adjusted under 35 U.S.C. 154(b) by 610 days.

(21) Appl. No.: 12/969,158

(22) Filed: Dec. 15, 2010

(65) Prior Publication Data

US 2011/0160318 A1  Jun. 30, 2011

(30) Foreign Application Priority Data

Dec. 28, 2009  (EP) .................................. 09180827

(51) Int. Cl.
  *B01J 8/06*  (2006.01)
  *B01J 8/04*  (2006.01)
  *C10G 2/00*  (2006.01)

(52) U.S. Cl.
  CPC . *B01J 8/06* (2013.01); *C10G 2/341* (2013.01); *B01J 2208/00017* (2013.01); *B01J 2208/00663* (2013.01); *B01J 2208/00672* (2013.01); *B01J 2208/00681* (2013.01); *B01J 2208/025* (2013.01)
  USPC ........... 422/211; 422/631; 422/652; 422/653; 518/706; 518/712

(58) Field of Classification Search
  None
  See application file for complete search history.

(56) References Cited

U.S. PATENT DOCUMENTS

| 2,450,500 | A | 10/1948 | Clark .......................... 260/449.6 |
| 3,857,780 | A | 12/1974 | Gustafson |
| 3,966,644 | A | 6/1976 | Gustafson |
| 5,080,872 | A * | 1/1992 | Jezl et al. ....................... 422/201 |
| 6,262,131 | B1 * | 7/2001 | Arcuri et al. ................... 518/700 |
| 2004/0076562 | A1 * | 4/2004 | Manzanec et al. ............ 422/211 |
| 2004/0192989 | A1 | 9/2004 | Espinoza et al. .............. 585/638 |
| 2009/0293359 | A1 | 12/2009 | Simmons et al. ............ 48/127.7 |
| 2013/0023594 | A1 * | 1/2013 | Van Hardeveld et al. ...... 518/715 |

FOREIGN PATENT DOCUMENTS

| EP | 1556165 | 5/2004 | .............. B01J 35/04 |
| EP | 1890802 | 11/2006 | .............. B01J 19/00 |
| EP | 1904223 | 1/2007 | |
| EP | 2111438 | 7/2008 | |
| EP | 1966348 | 4/2010 | ................ B01J 8/04 |
| GB | 510514 | 8/1939 | |
| WO | 2003013725 | 2/2003 | |
| WO | 2003103833 | 12/2003 | |
| WO | 2004041430 | 5/2004 | |
| WO | WO 2004085575 | 10/2004 | |
| WO | 2008087149 | 7/2008 | |
| WO | WO 2008089376 | 7/2008 | |
| WO | WO 2009126769 | 10/2009 | .............. B01J 19/00 |
| WO | 2010063850 | 6/2010 | |
| WO | 2010069925 | 6/2010 | |
| WO | 2010069927 | 6/2010 | |

* cited by examiner

*Primary Examiner* — Jennifer A Leung

(57) ABSTRACT

The present invention pertains to a reactor tube comprising a fixed bed of Fischer-Tropsch catalyst particles, wherein the catalyst particles in 5% to 40% of the fixed bed volume at the upstream end have an average outer surface to volume ratio (S/V) in the range of between 3.0 to 4.5 mm$^{-1}$, and the catalyst particles in the remaining fixed bed volume have an average outer surface to volume ratio (S/V) in the range of between 4.5 to 8.0 mm$^{-1}$, and wherein the difference between the average S/V of the particles at the upstream end and the average S/V of the particles in the remaining fixed bed volume is at least 0.5 mm$^{-1}$.

13 Claims, No Drawings

STACKED CATALYST BED FOR FISCHER-TROPSCH

This application claims the benefit of European Application No. 09180827.9 filed Dec. 28, 2009 which is incorporated herein by reference.

BACKGROUND OF THE INVENTION

The present invention relates to a fixed catalyst bed suitable to be used in a Fischer-Tropsch process, in particular to a fixed bed which is able to withstand a process for carrying out a high-speed stop in a Fischer-Tropsch process. The present invention further relates to the use of the fixed bed, and to a Fischer-Tropsch process in which the fixed bed is used.

The Fischer-Tropsch process can be used for the conversion of hydrocarbonaceous feed-stocks into normally liquid and/or solid hydrocarbons (0° C., 1 bar). The feed stock (e.g. natural gas, associated gas, coal-bed methane, residual oil fractions, biomass and/or coal) is converted in a first step into a mixture of hydrogen and carbon monoxide. This mixture is often referred to as synthesis gas or syngas. The synthesis gas is fed into a reactor where it is converted over a suitable catalyst at elevated temperature and pressure into paraffinic compounds ranging from methane to high molecular weight hydrocarbons comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebullated bed reactors. The Fischer-Tropsch reaction is very exothermic and temperature sensitive. In consequence, careful temperature control is required to maintain optimum operation conditions and desired hydrocarbon product selectivity.

The fact that the reaction is very exothermic also has the consequence that when temperature control is not adequate, the reactor temperature can increase very quickly, which carries the risk of a reactor runaway. A reactor runaway may result in highly increased temperatures at one or more locations in the reactor. A reactor runaway is a most undesirable phenomenon, as it may result in catalyst deactivation which necessitates untimely replacement of the catalyst, causing reactor downtime and additional catalyst cost.

A high-speed stop may, for example, be required when the temperature in the Fischer-Tropsch reactor increases to an unacceptable value either locally or over the entire reactor, when there is an interruption in the gas flow, or in the case of other unforeseen circumstances. When there is a threat of a runaway, it is often wise to stop the reaction as quickly as possible. Several processes for carrying out a high-speed stop in a
Fischer-Tropsch reactor have been developed.

The desired use of highly active and less diffusion limited catalysts in Fischer-Tropsch fixed-bed reactors makes the situation even more challenging. The susceptibility to a runaway increases with increased catalyst activity and with reduced diffusion limitation of the catalyst. Examples of methods that are especially suitable for Fischer-Tropsch fixed-bed reactors comprising highly active and less diffusion limited catalysts can be found in WO2010063850, WO2010069925, and WO2010069927.

When a high-speed stop is carried out in a fixed-bed reactor, a rise in temperature, culminating in a process-side temperature peak is often observed. If a process-side temperature peak is observed, it is usually observed at the upstream side of the catalyst bed.

A process-side temperature peak is generally caused by a decrease in gas space velocity which leads to an increased conversion, accompanied by increased heat formation, and simultaneously to a decrease in heat removal capacity.

The peak temperature increase can be minimised by choosing the right method for the high-speed stop, but it will nevertheless have some influence on the catalyst bed. Especially when less diffusion limited catalysts in Fischer-Tropsch fixed-bed reactors are applied, the conditions during a high-speed stop are critical. Therefore, there is need for a Fischer-Tropsch fixed-bed which is better able to withstand any kind of process for carrying out a high-speed stop in a Fischer-Tropsch process.

SUMMARY OF THE INVENTION

The present invention concerns a reactor tube comprising a fixed bed of Fischer-Tropsch catalyst particles, wherein the catalyst particles in 5% to 40% of the fixed bed volume at the upstream end have an average outer surface to volume ratio (S/V) in the range of between 3.0 to 4.5 mm−1, preferably in the range of between 3.3 to 4.0 mm−1, and the catalyst particles in the remaining fixed bed volume have an average outer surface to volume ratio (S/V) in the range of between 4.5 to 8.0 mm−1, preferably in the range of between 4.6 to 8.0 mm−1, more preferably in the range of between 4.8 to 7.5 mm−1. The difference between the average S/V of the particles at the upstream end and the average S/V of the particles in the remaining fixed bed volume is at least 0.5 mm$^{-1}$.

DETAILED DESCRIPTION OF THE INVENTION

Upstream and downstream are defined herein with respect to the flow of the syngas, i.e. the flow of the mixture of hydrogen and carbon monoxide, in a Fischer Tropsch reactor tube. Reference herein to the upstream end of the fixed bed of Fischer-Tropsch catalyst particles is thus to the end of the fixed bed to which the syngas is supplied during Fischer Tropsch reaction. Reference herein to the downstream end of the fixed bed of Fischer-Tropsch catalyst particles is to the other end.

The present invention concerns a reactor tube comprising a fixed bed of Fischer-Tropsch catalyst particles. A catalyst particle is defined for this specification as a particle that either is catalytically active, or that can be made catalytically active by subjecting it to hydrogen or a hydrogen containing gas.

For example, metallic cobalt is catalytically active in a Fischer-Tropsch reaction. In case the catalyst particle comprises a cobalt compound, the cobalt compound can be converted to metallic cobalt by subjecting it to hydrogen or a hydrogen containing gas. Subjection to hydrogen or a hydrogen containing gas is sometimes referred to as reduction or activation.

When a catalyst particle is referred to as comprising a certain amount of catalytically active metal, reference is made to the amount of metal atoms in the particle which are catalytically active when in metallic form. A catalyst particle comprising a cobalt compound, for example, is thus considered as a catalyst particle having a certain amount of catalytically active cobalt atoms. A catalyst particle thus comprises a certain amount of catalytically active metal, regardless of its oxidation state.

In a reactor tube according to the present invention, the average outer surface to volume ratio (S/V) of the catalyst particles varies along the length of the fixed bed. This results in a variation in diffusion limitation of the catalyst particles. Different reactants will typically travel through the catalyst at different rates. When the surface area of the catalyst is maximised, the diffusion limitation is minimised.

The diffusion limitation of a Fischer Tropsch catalyst is the diffusional mass transport limitation of the syngas components within the catalyst, i.e. the decrease of CO and/or hydrogen partial pressure and/or unfavorable change of the hydrogen/carbon monoxide-ratio within the catalyst.

Catalysts with a decreased diffusion limitation have a relatively high outer surface to volume ratio. When determining the outer surface of the particle, the surface area of the pores in the carrier material are ignored.

When the length, the diameter and the form, or shape of a catalyst, are known, the surface and volume can be determined using the appropriate calculations. When making calculations, usual deviations from the ideal shape, for example due to chips that may fall off and variations in length of the particles, may be taken into account.

The average length of a catalyst may be determined by measuring the length of at least 10 catalyst particles, preferably at least 50 catalyst particles.

The average cross section of a catalyst may be determined by cutting at least 10 catalyst particles, preferably at least 50 catalyst particles, transverse and measuring the circumference and the diameter. In case, for example, a microscope is used and the cut is about ten times magnified, the nanometer sized pores of the carrier material are not visible.

A fairly recent trend in the development of Fischer-Tropsch catalysts is the development of catalyst particles with a decreased diffusion limitation. It has been found that catalysts with a decreased diffusion limitation are highly active in Fischer-Tropsch processes. However, due to their high activity and their higher activation energy, their use entails an increased risk of reactor runaway. Further, it has also been found that catalysts with a decreased diffusion limitation are particularly sensitive to a high-speed stop. Therefore, the present invention is of particular interest for reactors comprising a catalyst with decreased diffusion limitation.

The present invention is even more of interest for reactors comprising a catalyst with a decreased diffusion limitation and an effective diameter, i.e. the diameter of a sphere with the same outer surface over inner volume ratio, of at most 2 mm, preferably of at most 1.6 mm, more preferably of at most 1.5 mm.

Catalysts with a decreased diffusion limitation are for example described in WO2003013725, WO2008087149, WO2003103833, and WO2004041430.

Catalysts with a decreased diffusion limitation used in a reactor according to the present invention preferably have an outer surface to volume ratio (S/V) larger than 4.5 mm$^{-1}$, more preferably larger than 4.6 mm$^{-1}$, even more preferably larger than 4.8 mm$^{-1}$.

Catalysts with a decreased diffusion limitation have an outer surface to volume ratio (S/V) preferably smaller than 8.0 mm$^{-1}$, more preferably smaller than 7.5 mm$^{-1}$. When determining the S/V ratio, the error made normally is about 0.1 mm$^{-1}$.

It was now found that a combination of catalysts with a decreased diffusion limitation and catalysts with a normal diffusion limitation makes it possible to reduce the problems faced when working with catalysts with a decreased diffusion limitation.

Catalysts with a normal diffusion limitation are, for example, trilobe catalysts with a 'cloverleaf' cross section. Examples of such trilobes have been described in, for example, U.S. Pat. Nos. 3,857,780 and 3,966,644. Trilobe catalysts with a 'cloverleaf' cross section are sometimes referred to as "TL" shaped catalysts. A trilobe catalyst with a 'cloverleaf' cross section shows a good mechanical strength but also shows significant mass transfer limitations. Especially for Fisher Tropsch reactions and hydrocracking reactions the mass transfer limitations of such trilobe catalysts are significant.

Catalysts with a normal diffusion limitation used in a reactor according to the present invention preferably have an average outer surface to volume ratio (S/V) in the range of between 3.0 to 4.5 mm$^{-1}$, preferably in the range of between 3.3 to 4.0 mm$^{-1}$.

One advantage of the present invention is that with this configuration the catalyst bed in the reactor tube is better able to withstand a process for carrying out a high-speed stop in a Fischer-Tropsch process.

When a Fischer-Tropsch process is performed and the reactor is at reaction temperature and pressure and effluent is being withdrawn from the reactor, and this process is suddenly brought to an end by a high-speed stop, a local raise in temperature, culminating in a local process-side temperature peak, is often observed. Such a local process-side temperature peak is usually observed at the upstream side of the catalyst bed. This is generally caused by a decrease in gas space velocity which leads to an increased conversion, accompanied by increased heat formation, and simultaneously to a decrease in heat removal capacity.

It has now been found that the catalyst bed in a reactor tube according to the present invention shows an increase in peak temperature during a high-speed stop according to a certain method which is lower than the increase in peak temperature which is obtained when the same high-speed stop method is applied to a fixed bed in a reactor tube whereby both the catalysts in the upstream end of the fixed bed and the catalysts in the remaining fixed bed volume have a decreased diffusion limitation.

The fact that the catalyst bed in a reactor tube according to the present invention is better able to withstand a high-speed stop in a Fischer-Tropsch process gives more freedom in choosing a method for the high-speed stop. For example, apart from the methods described in WO2010063850, WO2010069925, and WO2010069927, for some embodiments it is possible to apply a more robust but also simpler high-speed stop by blocking the flow of feed to the reactor and depressurising the reactor via the bottom.

Another advantage is that with a catalyst bed in a reactor tube according to the present invention it is possible to prepare a catalyst bed with a higher selectivity during the Fischer-Tropsch process. A further advantage is that a better temperature profile over the catalyst bed in the reactor tube is obtained during the Fischer-Tropsch process. Another advantage is that it is possible to prepare a catalyst bed that forms less methane during the Fischer-Tropsch process.

In a reactor tube according to a preferred embodiment of the present invention, the full-bed apparent catalytic activity of the catalyst particles varies along the length of the fixed bed. The full-bed apparent catalytic activity of the catalyst particles in the upstream end of the fixed bed is lower than the apparent catalytic activity of the catalyst particles in the downstream end.

The full-bed apparent catalytic activity of catalyst particles is the activity of such catalyst particles as measured under standard test conditions. This can be compared with the full-bed apparent catalytic activity of other catalyst particles which have been measured under the same standard test conditions. The full-bed apparent catalytic activity of a part of a stacked fixed bed is the activity of a part of a stacked fixed bed as measured under standard test conditions. This can be compared with the full-bed apparent catalytic activity of one or more other parts of the fixed bed which has/have been measured under the same standard test conditions.

Process conditions that are generally monitored during standard test conditions are, for example, temperature, pressure, reactants composition, conversion level, flow rate of reactants, catalyst volume and catalyst bed height.

The full-bed apparent catalytic activity may differ from the local activity measured during a reaction process, as the local reaction conditions may differ along the length of the reactor tube.

A reactor tube according to the present invention preferably comprises a fixed bed of Fischer-Tropsch catalyst particles in which all catalyst particles comprise the same metal as catalytically active metal. It is however also possible to have a different type of catalytically active metal in the catalyst particles at the upstream end of the fixed bed as compared to the catalyst particles in the rest of the fixed bed.

In a preferred embodiment of the present invention, the surface area of catalytically active metal in the upstream end of the fixed bed is lower than in the downstream end.

In another preferred embodiment of the present invention, the concentration of catalytically active metal in the upstream end of the fixed bed is lower than in the downstream end.

In a further preferred embodiment of the present invention, the dispersion of catalytically active metal in the upstream end of the fixed bed is lower than in the downstream end.

A reactor tube comprising a fixed bed of Fischer-Tropsch catalyst particles may be filled partly with the catalyst bed, and the other part may be empty. For example, some empty space may be present in the reactor tube above and below the catalyst bed.

The "fixed bed volume" of a fixed bed in a reactor tube is defined as the inner volume of that part of the reactor tube where the fixed bed of catalyst particles is present. This volume thus includes the volume taken by the catalyst particles. For example, when a cylindrical reactor tube with a height (or length) of 12 meters and an inner diameter of 2 cm contains a fixed bed of catalyst particles over a length of 11 meters, the fixed bed volume is the inner volume of the reactor tube along these 11 meters, which is:

$$\text{height} * \pi * (\text{radius})^2 = 11 \text{ meters} * \pi * (1 \text{ cm})^2.$$

As mentioned above, a reactor tube may be partially filled with a fixed bed of catalyst particles. Preferably the reactor tube contains a fixed bed of catalyst particles over at least 85% of the length of the reactor tube, more preferably over at least 90%. Preferably the reactor tube contains a fixed bed of catalyst particles over at most 97% of the length of the reactor tube, more preferably over at most 95%. The total fixed bed volume thus preferably is at least 85%, more preferably at least 90% of the total inner volume of a reactor tube. The total fixed bed volume preferably is at most 97%, more preferably at most 95% of the total inner volume of a reactor tube.

According to one aspect of the present invention, the fixed bed comprises Fischer-Tropsch catalyst particles having a size of at least 1 mm. Particles having a size of at least 1 mm are defined as particles having a longest internal straight length of at least 1 mm. Preferably at least 50 wt %, more preferably at least 75 wt %, even more preferably at least 90 wt % of the particles in the fixed bed have a size of at least 1 mm.

The shape of catalyst particles used in the present invention may be regular or irregular. The dimensions are suitably 0.1-30 mm in all three directions, preferably 0.1-20 mm in all three directions, more in particular 0.1-6 mm. The particles may comprise a carrier material and a catalytically active metal. The particles may additionally comprise a support, for example a metal support. Suitable catalyst particles comprising a metal support are, for example, described in US20090270518. Suitable shapes are spheres, pellets, rings and, in particular, extrudates. Suitable ring shapes are, for example, described in US20090134062.

Extrudates suitably have a length between 0.5 and 30 mm, preferably between 1 and 6 mm. Extrudates may be cylindrical, polylobal, or have any other shape. Their effective diameter, i.e. the diameter of a sphere with the same outer surface over inner volume ratio, is suitably in the range of 0.1 to 10 mm, more in particular in the range of 0.2-6 mm.

Catalysts used in a Fischer-Tropsch reaction often comprise a carrier based support material and one or more metals from Group 8-10 of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO9700231A and U.S. Pat. No. 4,595,703.

References to "Groups" and the Periodic Table as used herein relate to the new IUPAC version of the Periodic Table of Elements such as that described in the 87th Edition of the Handbook of Chemistry and Physics (CRC Press).

In one embodiment, the concentration of catalytically active metal in the upstream end of the fixed bed is lower than in the downstream end. This may be achieved by filling the reactor tube at the upstream end with less catalyst particles than at the downstream end.

Fewer particles at the upstream end may be achieved in different ways. For example, the upstream end of the catalyst bed may comprise both catalyst particles and inert particles. Additionally or alternatively, the catalyst particles at the upstream end may have a different shape and/or may be longer than the catalyst particles at the downstream end. Additionally or alternatively, the catalyst particles at the upstream end may be loaded into the reactor tube at a higher speed than the catalyst particles at the downstream end.

A lower concentration of catalytically active metal in the upstream end of the fixed bed than in the downstream end may additionally or alternatively be achieved by filling the reactor tube at the upstream end with catalyst particles having a lower concentration of catalytically active metal than the catalyst particles at the downstream end.

A lower full-bed apparent catalytic activity in the upstream end of the fixed bed may additionally or alternatively be achieved by filling the reactor tube at the upstream end with catalyst particles that have a lower dispersion of catalytically active metal than the catalyst particles at the downstream end.

In a reactor tube according to the present invention the average outer surface to volume ratio (S/V) in the upstream end of the fixed bed is smaller than in the downstream end. The average outer surface to volume ratio (S/V) may vary over the fixed bed according to a gradient. It is also possible to have two or more layers with different average outer surface to volume ratio (S/V). For example, the fixed bed may comprise a layer with a lower average outer surface to volume ratio (S/V) at the upstream end, and one or more other layers with a higher average outer surface to volume ratio (S/V) at the downstream end.

In one embodiment, 5% to 40% of the fixed bed volume at the upstream end shows a lower full-bed apparent catalytic activity than the remaining fixed bed volume. More preferably, 5% to 40% of the fixed bed volume at the upstream end shows a full-bed apparent catalytic activity per volume unit which is 30% to 70% lower than the full-bed apparent catalytic activity per volume unit in the remaining fixed bed volume.

In one embodiment, the amount of catalytically active metal per volume unit in 5% to 40% of the fixed bed volume at the upstream end is 30 to 70% lower than the amount of catalytically active metal per volume unit in the remaining fixed bed volume. This may be achieved by filling 5% to 40% of the fixed bed volume at the upstream end with less catalyst particles than in the remaining fixed bed volume, and/or by filling 5% to 40% of the fixed bed volume at the upstream end with catalyst particles having a lower concentration of catalytically active metal than the catalyst particles in the remaining fixed bed volume.

In one embodiment, 25% to 50% of the fixed bed volume at the downstream end shows a higher full-bed apparent catalytic activity than the remaining fixed bed volume. More preferably, 5% to 40% of the fixed bed volume at the downstream end shows a full-bed apparent catalytic activity per volume unit which is 1.5 to 3 times higher than the full-bed apparent catalytic activity per volume unit in the remaining fixed bed volume.

In one embodiment, the amount of catalytically active metal per volume unit in 25% to 50% of the fixed bed volume at the downstream end is 1.5 to 3 times higher than the amount of catalytically active metal per volume unit in the remaining fixed bed volume. This may be achieved by filling 25% to 50% of the fixed bed volume at the downstream end with catalyst particles having a higher concentration of catalytically active metal than the catalyst particles in the remaining fixed bed volume. Additionally or alternatively, this may be achieved by filling 25% to 50% of the fixed bed volume at the downstream end with catalyst particles having a higher dispersion of catalytically active metal, and thus a higher surface area of catalytically active metal.

In one embodiment, the fixed bed of catalyst particles comprises three layers, each with a different full-bed apparent catalytic activity. The layer at the upstream end preferably takes 5% to 40% of the fixed bed volume and shows the least full-bed apparent catalytic activity of the three layers. The layer at the downstream end preferably takes 25% to 50% of the fixed bed volume sand shows the highest full-bed apparent catalytic activity of the three layers.

The invention further pertains to the use of a reactor tube according to the invention for performing a Fischer Tropsch reaction.

The invention further pertains to a Fischer Tropsch reaction in which a reactor tube according to the invention is used.

The invention further pertains to a process for carrying out a high-speed stop in a Fischer-Tropsch process which comprises providing a feed to a fixed bed reactor comprising a Fischer-Tropsch catalyst, the reactor being at reaction temperature and pressure, and withdrawing an effluent from the reactor, characterised in that the high-speed stop is effected in a reactor tube according to the invention.

In a preferred embodiment the reactor tube has a ratio between length and diameter of at least 5, in particular at least 50. As an upper limit a ratio of at most 1000 may be mentioned.

In one embodiment, the reactor tube is a tube in a multitubular reactor, which comprises a plurality of reactor tubes at least partially surrounded by a heat transfer medium.

The tubes in a multitubular reactor generally have a diameter in the range of 0.5-20 cm, more in particular in the range of 1 to 15 cm. They generally have a length in the range of 3 to 30 m. The number of tubes in a multitubular reactor is not critical to the present invention and may vary in wide ranges, for example in the range of 4 to 50,000, more in particular in the range of 100 to 40,000.

Multitubular reactors and their use in Fischer-Tropsch processes are known in the art and require no further elucidation here.

The Fischer-Tropsch reaction is preferably carried out at a temperature in the range from 125 to 400° C., more preferably 175 to 300° C., most preferably 200 to 260° C. The pressure preferably ranges from 5 to 150 bar, more preferably from 20 to 80 bar. The gaseous hourly space velocity may vary within wide ranges and is typically in the range from 500 to 10000 Nl/l/h, preferably in the range from 1500 to 4000 Nl/l/h. The hydrogen to CO ratio of the feed as it is fed to the catalyst bed generally is in the range of 0.5:1 to 2:1.

Products of the Fischer-Tropsch synthesis may range from methane to heavy hydrocarbons. Preferably, the production of methane is minimised and a substantial portion of the hydrocarbons produced have a carbon chain length of a least 5 carbon atoms. Preferably, the amount of C5+ hydrocarbons is at least 60% by weight of the total product, more preferably, at least 70% by weight, even more preferably, at least 80% by weight, most preferably at least 85% by weight. The CO conversion of the overall process is preferably at least 50%.

The products obtained via the process according to the invention can be processed through hydrocarbon conversion and separation processes known in the art to obtain specific hydrocarbon fractions. Suitable processes are for instance hydrocracking, hydroisomerisation, hydrogenation and catalytic dewaxing. Specific hydrocarbon fractions are for instance LPG, naphtha, detergent feedstock, solvents, drilling fluids, kerosene, gasoil, base oil and waxes.

Fisher-Tropsch catalysts are known in the art. They typically comprise a Group 8-10 metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or combinations thereof.

The optimum amount of catalytically active metal present on the carrier depends inter alia on the specific catalytically active metal. Typically, the amount of catalytically active metal present in the catalyst may range from 1 to 100 parts by weight per 100 parts by weight of carrier material, preferably from 3 to 50 parts by weight per 100 parts by weight of carrier material.

A most suitable catalyst comprises cobalt as the catalytically active metal and titania as carrier material.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Suitable metal promoters may be selected from Groups 7-10 of the Periodic Table of Elements. Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

A most suitable catalyst comprises cobalt as the catalytically active metal and zirconium as a promoter. Another most suitable catalyst comprises cobalt as the catalytically active metal and manganese and/or vanadium as a promoter. If the catalyst comprises cobalt as the catalytically active metal and manganese and/or vanadium as promoter, the cobalt : (manganese+vanadium) atomic ratio is advantageously at least 12:1.

It will be understood that it is within the scope of the skilled person to determine and select the most appropriate conditions for a specific reactor configuration and reaction regime.

The present invention is illustrated by the following example, without being limited thereto or thereby.

EXAMPLES

Several examples have been performed with Fischer-Tropsch catalysts. Each set of experiments was performed using the same type of Fischer-Tropsch reactor tube, the same or very similar Fischer-Tropsch reaction conditions, and catalysts with similar length. All catalysts comprised titania as carrier, cobalt as catalytically active metal and manganese as promoter.

Example 1; Comparative Example

Catalysts were prepared comprising 20 wt % cobalt, calculated on the total weight of the catalysts. The shape of the catalysts was a trilobe shape with a 'cloverleaf' cross section as described in U.S. Pat. Nos. 3,857,780 and 3,966,644. The catalysts thus had a "TL" shape.

A reactor tube was filled with these catalysts.

Example 2; Comparative Example

Catalysts were prepared comprising 20 wt % cobalt, calculated on the total weight of the catalysts. The shape of the catalysts was a so-called "CA" shape, as described in WO2004041430. The cross-section of the particles had the shape of the letter C, whereby the "middle" of this C-shape was relatively thin. A reactor tube was filled with these catalysts.

Example 3 According to Invention

A reactor tube was filled with two types of catalyst. Both types comprised 20 wt % cobalt, calculated on the total weight of the catalysts. The catalyst that was first put in the reactor tube had a "CA" shape, as described in WO2004041430. The cross-section of the particles had the shape of the letter C, whereby the "middle" of this C-shape was relatively thin. The catalyst that was put on top of that had a "TL" shape as described in U.S. Pat. Nos. 3,857,780 and 3,966,644. The top layer (TL, 20 wt % Co) took 25 volume % of the fixed bed volume. The rest of the fixed bed volume contained the other particles (CA, 20 wt % Co).

Results for Examples 1 to 3

The reactor tubes were placed in a Fischer Tropsch reactor. Syngas was supplied and the Fischer-Tropsch reaction taking place was analysed. The Fischer-Tropsch processes were operated at a temperature of about 200° C. and a pressure of about 40 bar.

The reactor tubes were also subjected to a high-speed stop. The high-speed method used was as follows. The flow of syngas to the reactor was blocked, while maintaining a nitrogen feed of 50 Nl/l/h. The reactor was depressurised via the bottom to a pressure of 20 barg in 3 minutes, and then to a pressure of 6 barg in an additional 7 minutes.

The overall activity of each fixed bed was tested before and after the high-speed stop. The relative activity reduction after the high-speed stop was calculated with respect to the activity before the high-speed stop for the same fixed bed.

The results of these tests, for the reactor tubes as a whole, can be found in Table 2.

TABLE 2

| Experiment | Fixed bed | Activity reduction after high-speed stop |
|---|---|---|
| 1 (comparative) | TL, 20 wt % Co | −15% |
| 2 (comparative) | CA, 20 wt % Co | −75% |
| 3 (according to invention) | TL, 20 wt % Co (top 25 vol %) CA, 20 wt % Co (75 vol %) | −15% |

From the results of Examples 1 to 3 is clear that the high-speed stop method used had different effects on the different fixed bed types tested. Example 2 (CA, 20 wt % Co) shows that this catalyst bed with highly active and less diffusion limited catalysts was very sensitive to the high-speed stop method used.

The catalyst bed according to the invention (Example 3) with highly active and less diffusion limited catalysts (CA, 20 wt % Co) was able to withstand the high-speed stop method used in these examples, due to the top layer of catalyst particles with a normal diffusion limitation (TL, 20 wt % Co).

Besides its ability to withstand high-speed stops, the catalyst bed according to the invention has a high activity due to the large amount of highly active and less diffusion limited catalysts (CA, 20 wt % Co).

What is claimed is:

1. A reactor tube comprising a fixed bed of Fischer-Tropsch catalyst particles, wherein the catalyst particles in 5% to 40% of the fixed bed volume at the upstream end have an average outer surface to volume ratio (S/V) in the range of between 3.0 to 4.5 mm−1, and the catalyst particles in the remaining fixed bed volume have an average outer surface to volume ratio (S/V) in the range of between 4.5 to 8.0 mm−1, and wherein the difference between the average S/V of the particles at the upstream end and the average S/V of the particles in the remaining fixed bed volume is at least 0.5 mm−1.

2. The reactor tube according to claim 1, wherein the catalyst particles in 5% to 40% of the fixed bed volume at the upstream end have an average outer surface to volume ratio (S/V) in the range of between 3.3 to 4.0 mm−1.

3. The reactor tube according to claim 1, wherein the catalyst particles in the remaining fixed bed volume have an average outer surface to volume ratio (S/V) in the range of between 4.6 to 8.0 mm−1.

4. The reactor tube according to claim 1, wherein the catalyst particles in the remaining fixed bed volume have an average outer surface to volume ratio (S/V) in the range of between 4.8 to 7.5 mm−1.

5. The reactor tube according to claim 1, wherein the particles in the remaining fixed bed volume have an effective diameter of at most 2 mm.

6. The reactor tube according to claim 1, wherein the particles in the remaining fixed bed volume have an effective diameter of at most 1.6 mm.

7. The reactor tube according to claim 1, wherein the surface area of the catalytically active metal in the upstream end of the fixed bed is lower than in the downstream end.

8. The reactor tube according to claim 1, wherein the concentration of catalytically active metal in the upstream end of the fixed bed is lower than in the downstream end.

9. The reactor tube according to claim 1, wherein the dispersion of catalytically active metal in the upstream end of the fixed bed is lower than in the downstream end.

10. The reactor tube according to claim 1, wherein 5% to 40% of the fixed bed volume at the upstream end shows a full-bed apparent catalytic activity per volume unit which is 30% to 70% lower than the full-bed apparent catalytic activity per volume unit in the remaining fixed bed volume.

11. The reactor tube according to claim 1, wherein the amount of catalytically active metal per volume unit in 5% to 40% of the fixed bed volume at the upstream end is 30% to 70% lower than the amount of catalytically active metal per volume unit in the remaining fixed bed volume.

12. The reactor tube according to claim 1, wherein the full-bed apparent catalytic activity per volume unit in 25% to 50% of the fixed bed volume at the downstream end is 1.5 to 3 times higher than the full-bed apparent catalytic activity per volume unit in the remaining fixed bed volume.

13. The reactor tube according to claim 1, wherein the amount of catalytically active metal per volume unit in 25% to 50% of the fixed bed volume at the downstream end is 1.5 to 3 times higher than the amount of catalytically active metal per volume unit in the remaining fixed bed volume.

* * * * *